Patented Oct. 30, 1951

2,573,645

UNITED STATES PATENT OFFICE 2,573,645

N-HYDROXYETHYL AMINOINDANES

James F. Kerwin and Glenn E. Ullyot, Philadelphia, Pa., assignors to Smith, Kline & French Laboratories, Philadelphia, Pa., a corporation of Pennsylvania No Drawing. Application May 25, 1949,
Serial No. 95,378

6 Claims. (Cl. 260—570.6)

This invention relates to new compositions of matter which have utility as intermediates in the production of certain compounds having valuable physiological properties, more particularly adrenolytic or sympatholytic properties or antihistaminic properties.

The new compounds of the invention are hydrindene derivatives and may be represented by the general formula:

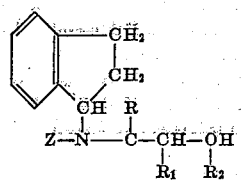

in which:

Z is a member of the group consisting of lower alkyl, lower alkenyl, phenyl, phenyl lower alkyl, lower alkoxy alkyl, and phenoxy lower alkyl radicals.

R, R₁, and R₂ are members of a group consisting of hydrogen, methyl and ethyl radicals.

This invention also contemplates the salts of the compounds defined by the above general formula, formed with organic and inorganic acids, as, for example, hydrochloric, hydrobromic, sulfuric, phosphoric, sulfamic, oxalic, maleic, etc. More specifically, the inorganic and organic salts will be such as are prepared with inorganic and organic acids having an ionization constant not less than $1 \times 10^{-2}$ at 18° C.

The compounds according to this invention will, as has been indicated, have utility as intermediates.

Thus, the compounds according to this invention may be treated for replacement of the hydroxyl (OH) group, an active group, with chlorine or bromine, by any usual well known procedure, using usual and well known reagents, as, for example, thionyl chloride, thionyl bromide, concentrated hydrochloric acid, concentrated hydrobromic acid, or the like, with the production of compounds, more particularly β-haloethyl-amines having the following general formula:

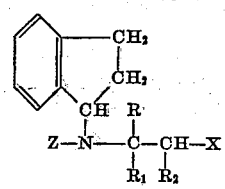

in which Z, R, R₁ and R₂ are as given above with respect to the general and more specific formulae given above and X is chlorine or bromine.

The β-chlorethylamines may be conveniently isolated as hydrohalide salts, from which the free bases may be recovered by usual and well known procedure, as by adding one equivalent of a strong alkali to a solution of the salt.

The compounds according to this invention may be prepared by various procedure. However, they will be conveniently prepared by a process in which α-chlorohydrindene is reacted with an N-monosubstituted amino alcohol. The preparation may be carried out by several different methods, e. g., the reaction may be carried out in the presence or absence of an acid binding agent or with or without a solvent. The reaction is carried out conveniently by heating α-chlorohydrindene with two molar equivalents of the appropriate amino alcohol in an inert solvent, such as benzene, toluene, xylene, or the like. The hydrogen chloride, which results as a by-product of the reaction, forms an addition salt with the excess amino alcohol and separates from the solution. After filtration, the product can be isolated by removing the solvent, as by evaporation, or by forming a salt with an acid.

The following examples will illustrate the various types of compounds contemplated by the invention as defined by the above general formula and procedure for their preparation.

EXAMPLE 1

*N-(α-hydrindenyl)-N-ethyl-β-hydroxy-ethylamine*

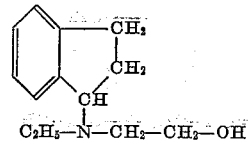

A solution of 25.8 g. of α-chlorohydrindene, 29.4 g. of ethylaminoethanol and 100 ml. of dry benzene is refluxed for one and one-half hours, cooled and filtered to remove ethylaminoethanol hydrochloride. The product, N-(α-hydrindenyl)-N-ethylaminoethanol, is obtained after filtration by evaporating off the solvent, or it may be obtained as the hydrochloride salt by passing dry hydrogen chloride into the filtrate. After several recrystallizations from alcohol and ether, the hydrochloride salt melts at 116–117° C.

As exemplifying the use of this compound as an intermediate, a solution of 6.6 g. of N-(α-hydrindenyl)-N-ethylaminoethanol hydrochloride, 10 g. of thionyl chloride and 50 ml. of chloroform is refluxed for one-half hour. The solvent is evaporated and the residue recrystallized from alcohol-ether. N-(α-hydrindenyl)-N - ethyl - β - chlorethylamine hydrochloride melts at 143–144° C.

EXAMPLE 2

*N-(α-hydrindenyl)-N-benzyl-β-hydroxy-ethylamine*

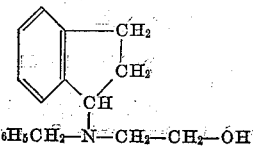

A solution of 23.5 g. of α-chlorohydrindene, 27.1 g. of benzylaminoethanol and 100 ml. of toluene is stirred and refluxed for two hours. Filtration removes benzylaminoethanol hydrochloride and the product compound will be obtained by evaporating off the solvent. Again, addition of dry hydrogen chloride to the toluene solution forms N-(α-hydrindenyl)-N-benzylaminoethanol hydrochloride, from which the free base will be recovered by well known procedure. After recrystallization of the salt from methanol and ether, it melts at 199–202° C.

As exemplifying the utility of this compound, a solution of 11 g. of thionyl chloride and 25 g. of chloroform is added to a cooled solution of 11 g. of N-(α-hydrindenyl)-N-benzylaminoethanol hydrochloride in 40 g. of chloroform. The solution is then warmed to 50–60° C. for an hour, the chloroform distilled off and the residue recrystallized from methanol and ether. N-(α-hydrindenyl)-N-benzyl-β-chlorethylamine hydrochloride melts at 184–185° C.

EXAMPLE 3

N-(α-hydrindenyl)-N-methyl-β-hydroxyethylamine

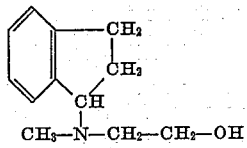

CH₃—N—CH₂—CH₂—OH

This compound will be prepared in the manner described for Example 1, except that methylaminoethanol will replace ethylaminoethanol.

EXAMPLE 4

N-(α-hydrindenyl)-N-allyl-β-hydroxyethylamine

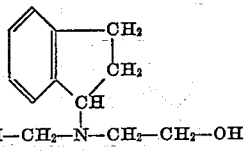

CH₂=CH—CH₂—N—CH₂—CH₂—OH

α-Chlorohydrindene and allylaminoethanol will be reacted in the manner indicated and the compound as the free base or its hydrohalide salt recovered as indicated in Example 1.

EXAMPLE 5

N-(α-hydrindenyl)-N-phenyl-β-hydroxyethylamine

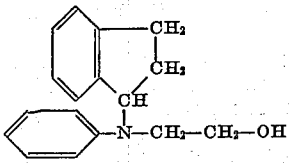

—N—CH₂—CH₂—OH

This compound will be prepared by reaction of α-chlorohydrindene and phenylaminoethanol in the manner indicated in Example 2.

EXAMPLE 6

N-(α-hydrindenyl)-N-(p-chlorophenyl)-β-hydroxyethylamine

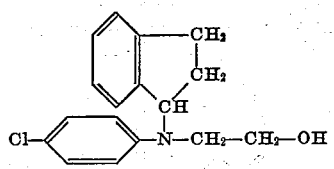

Cl—⟨ ⟩—N—CH₂—CH₂—OH

This compound will be prepared by the procedure described in Example 2, except that the benzylaminoethanol will be replaced by an equimolar amount of p-chlorophenylaminoethanol.

EXAMPLE 7

N-(α-hydrindenyl)-N-(p-methoxyphenylisopropyl)-β-hydroxyethylamine

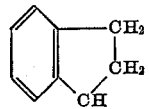

CH₃O—⟨ ⟩—CH₂—CH—N—CH₂—CH₂—OH
                    |
                    CH₃ p-Methoxyphenylisopropylaminoethanol is prepared as follows: One-half mole of p-methoxyphenylacetone is added to a cooled solution of 30.5 g. of ethanolamine in 75 ml. of alcohol. The solution is agitated under 3–4 atmospheres of hydrogen pressure in the presence of 0.5 g. of platinum oxide catalyst. When the hydrogen uptake is substantially complete, the catalyst is filtered off and the alcohol is removed by distillation. The residue is poured into 200 ml. of 3 N-hydrochloric acid, acid-insoluble material is extracted into ether and then the aqueous acid layer is separated and made basic with sodium hydroxide solution. The product is dried and distilled, B. P. 154–157° C. at 2 mm.

α-Chlorohydrindene and p-methoxyphenylisopropylaminoethanol will be reacted in benzene solution in the manner indicated in Example 1.

EXAMPLE 8

N-(α-hydrindenyl)-N-ethoxyethyl-β-hydroxyethylamine

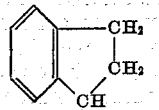

C₂H₅—O—CH₂—CH₂—N—CH₂—CH₂—OH

The procedure of Example 1 will be followed with ethoxyethylaminoethanol used instead of ethylaminoethanol.

EXAMPLE 9

N-(α-hydrindenyl)-N-phenoxyethyl-β-hydroxyethylamine

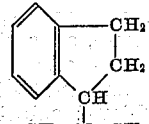

⟨ ⟩—OCH₂—CH₂—N—CH₂—CH₂—OH

The procedure of Example 1 is followed substituting a stoichiometrical equivalent of phenoxyethylaminoethanol for the ethylaminoethanol.

EXAMPLE 10

N-(α-hydrindenyl)-N-(p-methylphenoxyethyl)-β-hydroxyethylamine

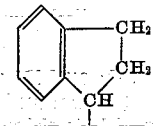

CH₃—⟨ ⟩—O—CH₂—CH₂—N—CH₂—CH₂—OH

This compound will be prepared by the procedure set forth in Example 2 except that, in the first step, the benzylaminoethanol will be replaced by an equimolar amount of p-methylphenoxyethylaminoethanols.

EXAMPLE 11

N - (α - hydrindenyl) - N - ethyl -1 - amino - 2- hydroxypropane

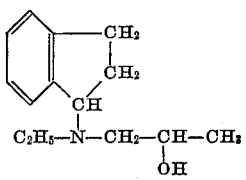

The procedure of Example 1 will be employed, using 1-ethylamino-2-propanol in place of ethylaminoethanol.

EXAMPLE 12

N - (α - hydrindenyl) - N - isopropyl - 2 - amino- 1-hydroxybutane

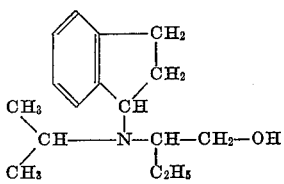

This compound will be prepared by reacting α-chlorohydrindene with 2-isopropylamino-1-butanol according to the method described under Example 1.

While, in the above examples, the products exemplified comprise free bases, the above several examples will serve as examples of the corresponding hydrohalide salts, the structure of which will be specifically exemplified and made apparent by addition of the radicals HCl or HBr in the structural formulae given in the above several examples.

The preparation of the free bases corresponding to the hydrochloride or hydrobromide salts of the above several examples, where the compounds are obtained as hydrohalide salts, will involve merely the addition of one equivalent of a strong alkali, as, for example, sodium hydroxide, to a solution of the several salts in a manner usual and well known to chemists for the preparation of a free base from its salt.

The general formula for compounds in accordance with this invention will, taken with the above several specific examples, serve as specifically exemplifying all of the several compounds contemplated by this invention, it being merely necessary for specific exemplification of all of the several compounds contemplated and of their specific structures to substitute in the above general formula the several substituents given for Z, R, R₁ and R₂, all of which will be made perfectly apparent by reference to the general formula and the specific examples.

Again, the procedure given for the preparation of the several compounds contemplated and as exemplified by the general formula in the light of the specific procedure given in the above several examples, will be applicable to the preparation of each and every of the compounds according to the above general formula and contemplated by this invention, it being only necessary for the preparation of any particular compound to use the corresponding reagents, all of which are well known to, or readily prepared by, those skilled in the art.

The preparation of any given organic or inorganic salt of any of the compounds according to the above general formula requires only the neutralization of the free bases of the several compounds with the desired inorganic or organic acid, as is usual and well known to the chemist for the preparation of an organic or inorganic salt of a free base.

This application is a continuation-in-part of application filed March 22, 1949, Serial No. 82,916.

What is claimed is:

1. A compound of the class consisting of a free base and its organic and inorganic salts, said free base having the formula

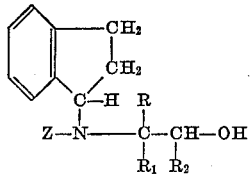

in which Z is a member of the group consisting of lower alkyl, lower alkenyl, phenyl, phenyl lower alkyl, lower alkoxy alkyl, and phenoxy lower alkyl radicals; and R, R₁, and R₂ are members of the group consisting of hydrogen, methyl, and ethyl radicals.

2. The compound having the structure:

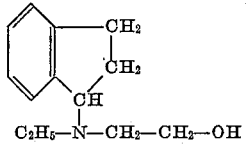

3. The compound having the structure:

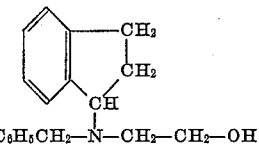

4. The compound having the structure:

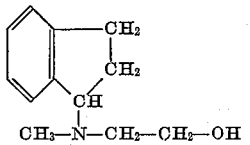

5. The compound having the structure:

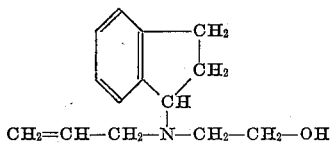

6. The compound having the structure:

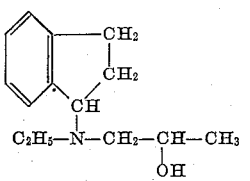

JAMES F. KERWIN.
GLENN E. ULLYOT.

REFERENCES CITED

The following references are of record in the file of this patent:

Courtot et al.: "Am. Chim.," vol. 4, pp. 231–292 (1925).

Courtot et al.: "Bull. Soc. Chim.," vol. 39, pp. 452–469 (1926).

Levin et al.: "J. Org. Chim.," vol. 9, pp. 380–391 (1944).